United States Patent [19]

Hlasnicek

[11] Patent Number: 5,630,305

[45] Date of Patent: May 20, 1997

[54] SURFACE COVERING UNIT METHODS OF USE AND MANUFACTURE

[76] Inventor: Richard S. Hlasnicek, 197 Skytrail Rd., Boulder, Colo. 80302

[21] Appl. No.: 445,166

[22] Filed: May 19, 1995

Related U.S. Application Data

[60] Continuation of Ser. No. 953,544, Sep. 29, 1992, abandoned, which is a division of Ser. No. 749,983, Aug. 26, 1991, abandoned.

[51] Int. Cl.$^6$ ...................................................... E04D 1/00
[52] U.S. Cl. ......................... 52/518; 52/747.1; 52/533; 264/220
[58] Field of Search ........................... 52/518, 533, 550, 52/553, 554, 558, 745, 747, 745.15, 745.19, 747.1, 742.1; 264/220, 225, 299, 328.1

[56] References Cited

U.S. PATENT DOCUMENTS

| | | | |
|---|---|---|---|
| 2,168,217 | 8/1939 | Kirschbraun | 52/518 X |
| 3,136,831 | 6/1964 | Zinn | 264/225 |
| 3,394,510 | 7/1968 | Adle | 52/745.19 X |
| 3,583,117 | 6/1971 | Roach | 52/554 X |
| 3,631,745 | 1/1972 | Walkey | 264/225 X |
| 3,641,228 | 2/1972 | Fleck | 264/225 X |
| 3,663,350 | 5/1972 | Stokes | 428/220 |
| 3,835,609 | 9/1974 | Oscar | 52/478 |
| 3,855,753 | 12/1974 | Terry | 52/520 |
| 3,917,890 | 11/1975 | Levy | 428/228 |
| 4,015,392 | 4/1977 | Eaton | 52/533 |
| 4,193,898 | 3/1980 | Miller . | |
| 4,207,224 | 6/1980 | Randell et al. | 524/123 |
| 4,226,069 | 10/1980 | Hinds | 52/521 |
| 4,245,055 | 1/1981 | Smith | 521/140 |
| 4,279,106 | 7/1981 | Gleason et al. | 52/558 X |
| 4,285,901 | 8/1981 | Yotsutsuji et al. | 264/225 |
| 4,290,248 | 9/1981 | Kemerer et al. . | |
| 4,343,126 | 8/1982 | Hoofe, III | 52/313 |
| 4,366,197 | 12/1982 | Hanlon et al. | 52/555 X |
| 4,372,090 | 2/1983 | Shichijo | 52/518 X |
| 4,376,843 | 3/1983 | Lindner et al. | 525/83 |
| 4,432,183 | 2/1984 | Pike et al. | 52/533 |
| 4,454,250 | 6/1984 | Florence et al. | 521/75 |
| 4,514,947 | 5/1985 | Grail | 52/533 X |
| 4,548,007 | 10/1985 | Newman | 52/745.19 X |
| 4,574,536 | 3/1986 | Bamber et al. | 52/533 X |
| 4,592,185 | 6/1986 | Lynch et al. | 52/543 |
| 4,598,522 | 7/1986 | Hoofe, III | 52/555 |
| 4,656,722 | 4/1987 | Armstrong | 264/225 X |
| 4,754,589 | 7/1988 | Leth | 52/533 X |
| 4,777,002 | 10/1988 | Putz | 264/225 X |
| 4,785,605 | 11/1988 | Jenn | 52/747 X |

(List continued on next page.)

FOREIGN PATENT DOCUMENTS

| | | | |
|---|---|---|---|
| 1955997 | 5/1971 | Germany | 264/227 |
| 138834 | 10/1979 | Japan | 264/225 |
| 798137 | 1/1981 | U.S.S.R. | 264/220 |
| 1580297 | 12/1980 | United Kingdom | 264/220 |
| 2145651 | 4/1985 | United Kingdom | 264/225 |

OTHER PUBLICATIONS

SPE Journal, Jun. 1969, vol. 25, pp. 53–55, Flexible Urethane Molds for the Furniture Industry, G.T. Morse.

*Primary Examiner*—Suzanne L. Dino
*Attorney, Agent, or Firm*—Harold A. Burdick

[57] ABSTRACT

A roofing and/or siding unit and methods are disclosed, the units being formed of an appropriately formulated flexible foamed PVC material, and having a size, overall shape, and exposed surface configuration modeled after a traditional building material unit for which the units of this invention may be substituted (for example shake shingles, or various types of roofing tiles). The units are manufactured by an injection molding process wherein one part of the mold utilized is made by taking a metal casting of the normally exposed surface of one of the traditional building units so that substantial duplicates thereof are produced by the molding process. Since the units produced are similar in size, shape and the like to the traditional type units, workers need no special training regarding their application, which in most applications requires no techniques differing from techniques utilized to apply the traditional building units after which the units of this invention are modeled.

16 Claims, 3 Drawing Sheets

U.S. PATENT DOCUMENTS

| | | | |
|---|---|---|---|
| 4,787,190 | 11/1988 | Papsdorf | 52/553 |
| 4,847,026 | 7/1989 | Jarboe et al. | 264/220 X |
| 4,914,883 | 4/1990 | Wencley | 52/745.19 X |
| 4,932,184 | 6/1990 | Waller | 52/535 |
| 5,037,685 | 8/1991 | Richards et al. | 52/518 X |
| 5,151,232 | 9/1992 | Thornthwaite et al. | 264/220 X |
| 5,214,895 | 6/1993 | Fifield | 52/533 |
| 5,232,530 | 8/1993 | Malmquist et al. | 52/558 X |
| 5,240,668 | 8/1993 | Garza | 264/225 |
| 5,245,809 | 9/1993 | Harrington | 52/745.19 X |
| 5,249,402 | 10/1993 | Crick et al. | 52/553 X |
| 5,250,250 | 10/1993 | Gorski | 264/225 X |
| 5,281,372 | 1/1994 | Hayashi et al. | 264/220 X |
| 5,295,339 | 3/1994 | Manner | 52/518 |
| 5,305,570 | 4/1994 | Rodriguez et al. | 52/533 X |

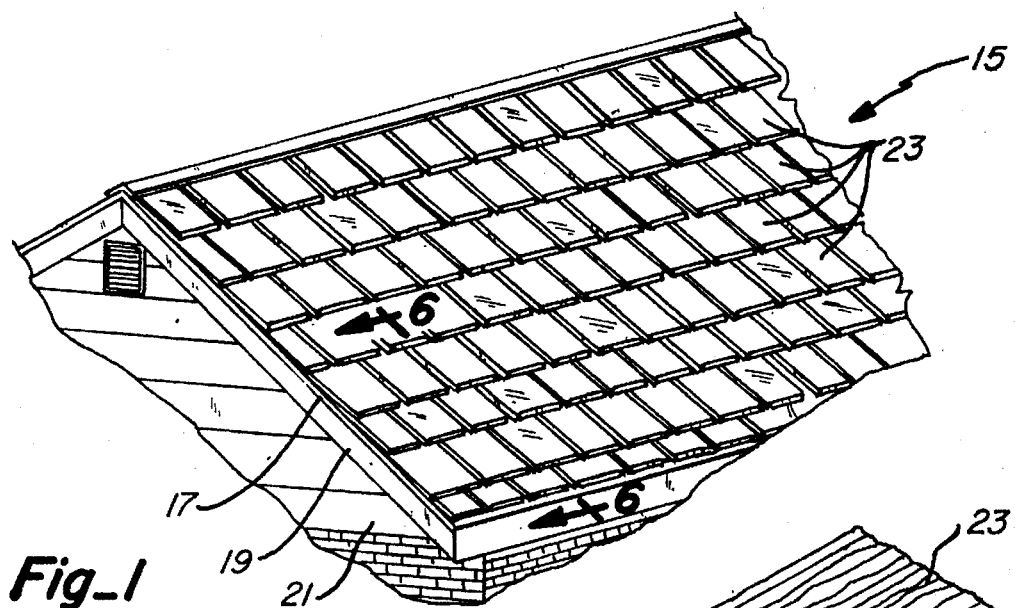
Fig_1
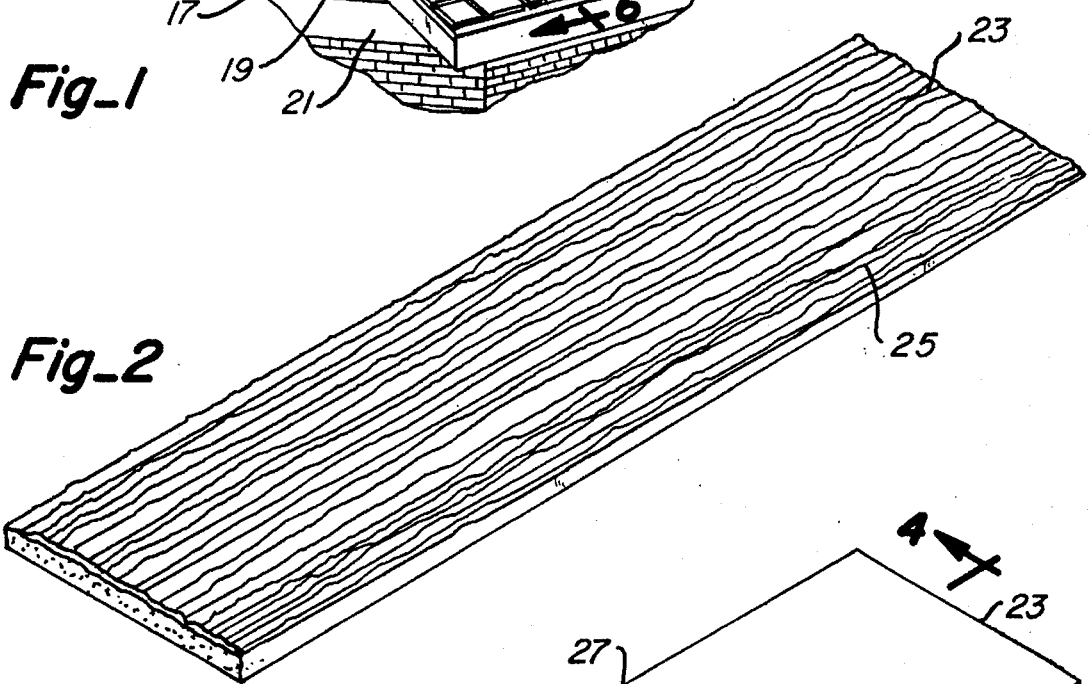
Fig_2
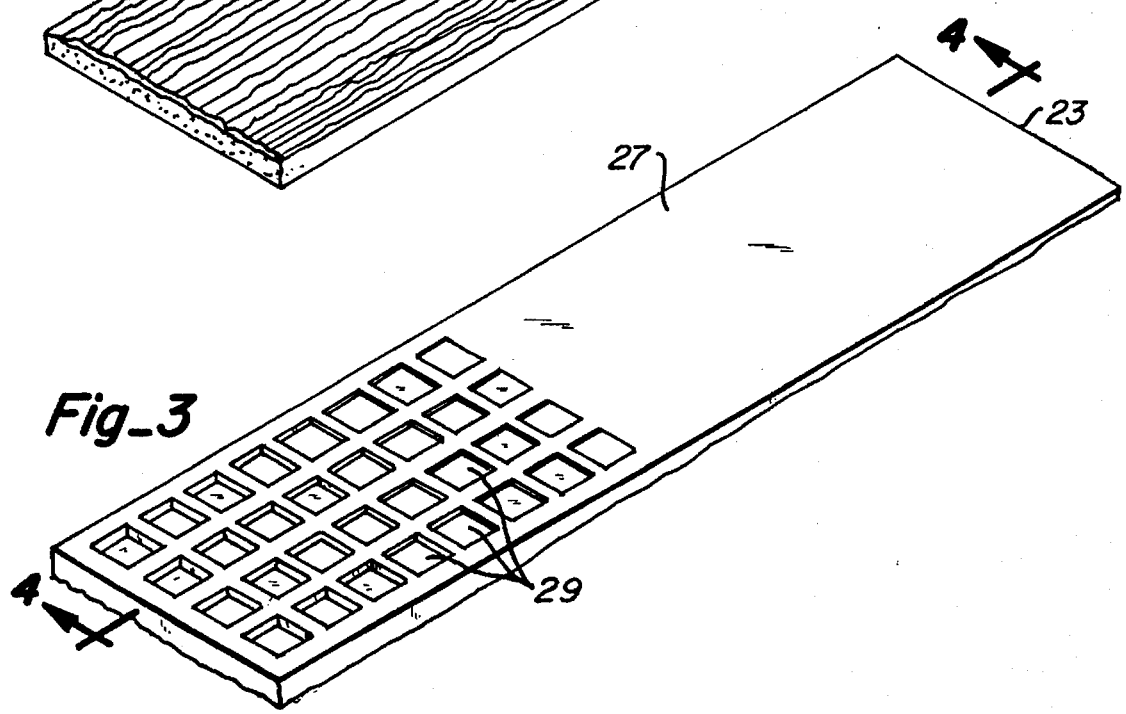
Fig_3

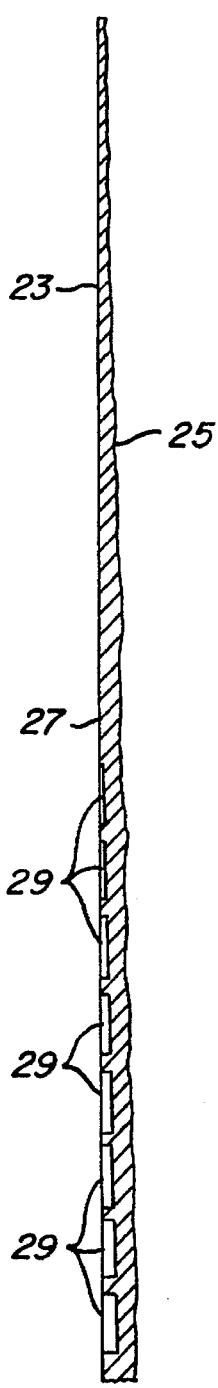
Fig_4
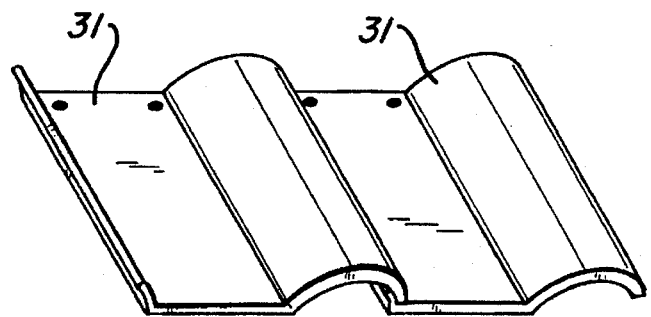
Fig_5A
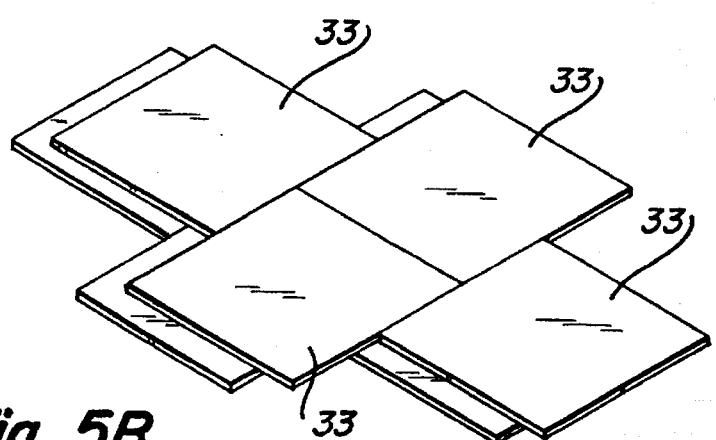
Fig_5B
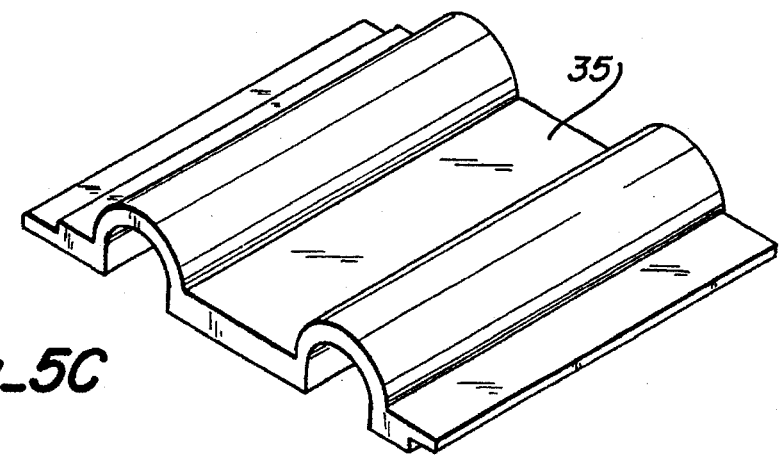
Fig_5C

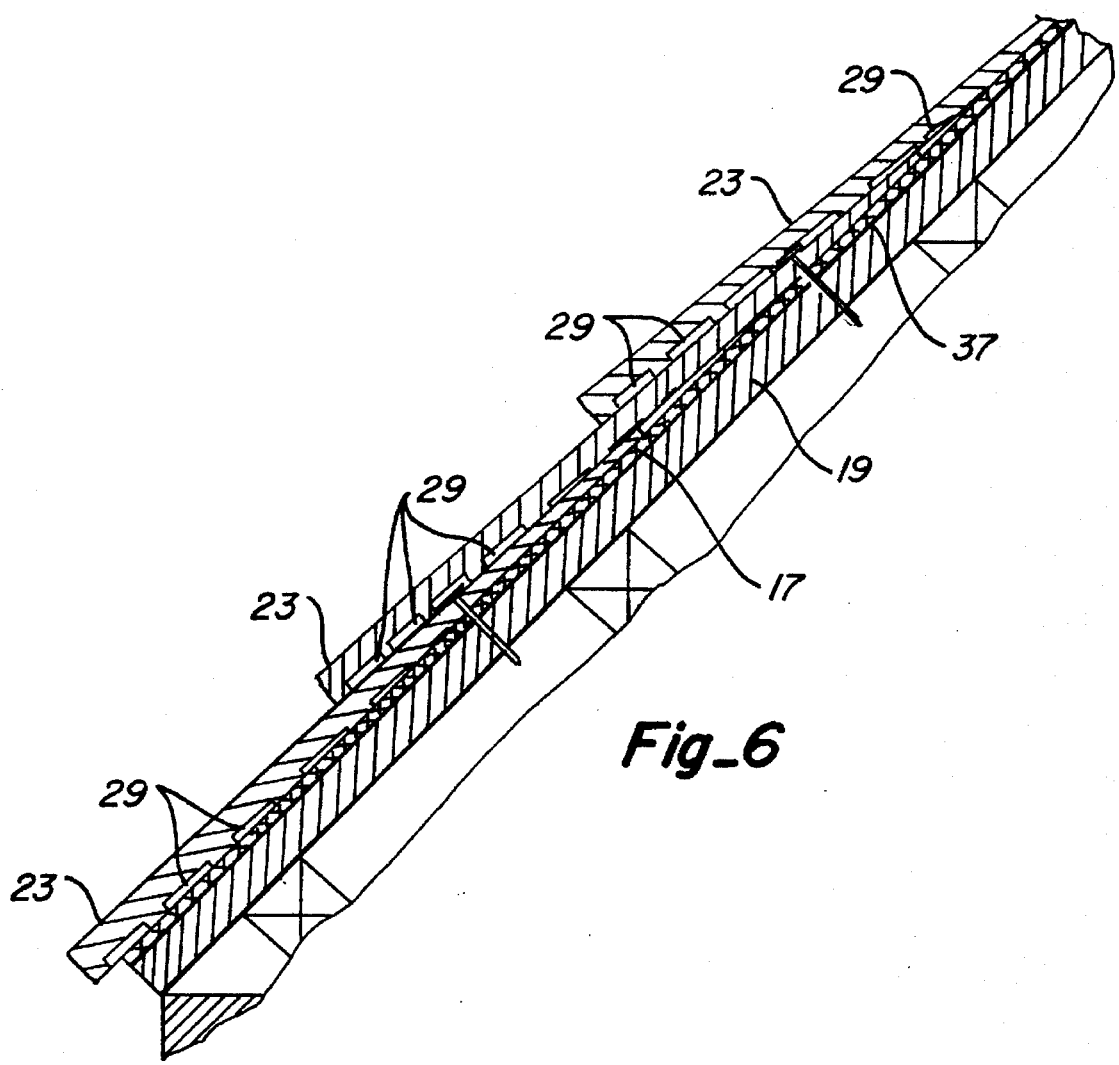
Fig_6
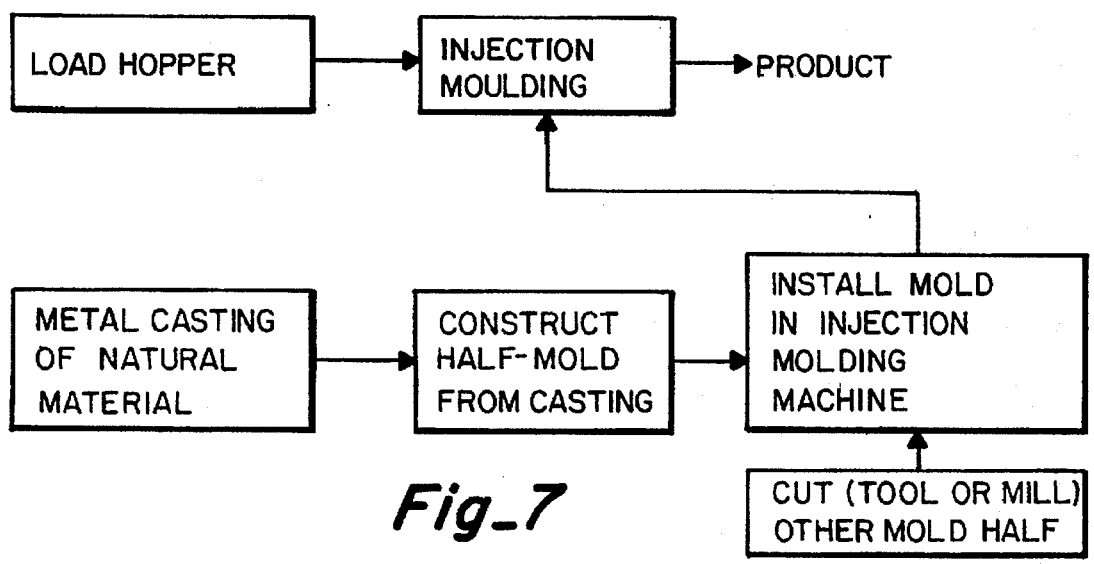
Fig_7

SURFACE COVERING UNIT METHODS OF USE AND MANUFACTURE

RELATED APPLICATION

This Application is continuation of U.S. patent application Ser. No. 07/953,544 filed Sep. 29, 1992, which is a Divisional application of U.S. patent application Ser. No. 07/749,983 filed Aug. 26, 1991, both now abandoned, entitled "SURFACE COVERING UNITS AND METHODS".

FIELD OF THE INVENTION

This invention relates to building materials, and, more particularly, relates to exterior surface covering building materials and methods.

BACKGROUND OF THE INVENTION

Traditional building materials for covering exterior surfaces of structures, such as walls or roofs, have included, for example, wooden shingles (some of which are known as shake shingles), cementitious tiles, baked clay tiles (for example Spanish tiles) and other well known, often made of naturally occurring, materials. These materials have enjoyed long standing acceptance, due both to their availability and attractiveness, in the trades. As a result of their familiarity, workmen are well acquainted with their use and techniques for their application.

Such materials do, however, have their drawbacks. In most cases, such materials are brittle, and thus subject to cracking and/or breakage upon exposure to adverse conditions, the brittleness of such materials often increasing with age, and are subject to shortened life due to sun and moisture exposure. When replacement is thus required of a unit of such material, large areas of the units must be taken up to effect the replacement.

In the case of cementitious and/or baked clay tiles, their use dramatically increases the load supported by load bearing structures in areas of their application. In the case of wooden materials, additional hazard in case of fire is documented, and, in the case of wooden shingles, their use is discouraged or even banned in some areas where fire danger is high. Wooden materials are also subject to degradation in the presence of fungus, certain insects, and the like, and require a heavier, and thus more expensive, underlayment to assure moisture sealing of the surface.

It would thus be desirable to provide a material to substitute for such traditional materials which is more resilient and flexible (and thus more easily replaced in case of unit failure), comparatively light weight, less susceptible to burning and attack by organisms, and which exhibits better water shedding and/or sealing characteristics, while substantially duplicating the appearance of the traditional materials and requiring no retraining of workers to effect its application to a structure (preferably being applied to a surface in substantially the same manner as the material after which its appearance is modeled).

While a variety of substitute materials have been suggested (see, for example, U.S. Pat. Nos. 4,193,898, 4,226,069, 3,855,753, 4,366,197, 4,015,392, 4,592,185, 4,932,184, 4,343,126, 4,598,522, 4,290,248, and 3,835,609), these have not addressed one or more of the above stated goals, typically providing relatively rigid panel-type units which require special structures and/or techniques for their application to a surface, which do not closely emulate the appearance of the materials substituted for, and which require replacement of an entire panel upon loss of unit integrity, often resulting in inability to match color (due to aging of surrounding panels) and/or undue repair effort and/or expense. Further improvement could thus still be utilized.

SUMMARY OF THE INVENTION

This invention provides improved building material unit methods of use and manufacture for units utilized in covering exterior surfaces of a structure. The units are made of a flexible plastic material which is resilient, comparatively light weight, less susceptible to burning and attack by organisms, and which exhibits desired water shedding and/or sealing characteristics, the units substantially duplicating the appearance of traditional materials and requiring no retraining of workers to effect their application to a structure.

The building material of this invention is used as a substitute for traditional building material units made of a different material, with each flexible unit having a size, overall shape and an exposed surface configuration modeled after a single one of the traditional building material units for which the flexible units are a substitute, the flexible units requiring no structure different from the traditional building units provided for purposes of mounting the flexible unit.

The plastic material preferably has a durometer of between about 75 and 115 (preferably between 90 and 100), and is preferably an appropriately formulated foamed PVC material which includes a flame retardant and a fungicide. Pigments are selected to, for example, simulate the coloration of the natural material for which the units are a substitute, or match the color of materials already present on the structure.

The methods of this invention include a method for covering a surface with a building material used as a substitute for traditional building material units made of a different material, including the steps of forming flexible units made of a flexible plastic material, each one of the flexible units having a size, overall shape, and an exposed surface configuration modeled after a single one of the traditional building material units, and applying the flexible units to the surface utilizing substantially only those techniques utilized to apply the traditional building material units.

The methods of this invention also include methods for manufacturing a building material used as a substitute for traditional building units made of a different material, with one of the methods including the steps of making a mold having first and second parts, the first part of which is made by taking a metal casting of the normally exposed surface of one of the traditional building units, mounting the parts of the mold in an injection molding machine, loading a plastic material including a blowing agent into the molding machine, the plastic material being characterized after processing by flexibility and a durometer of between about 75 and 115, and preferably between 90 and 100, and injecting the plastic material into the mold so that a unit is formed having a size, overall shape, and exposed surface configuration substantially similar to the traditional building unit.

The methods of this invention include steps directed to formation of the units with a plurality of sunken areas, preferably cavities, on a surface of the units which is normally unexposed and positionable adjacent to the surface to be covered.

It is therefore an object of this invention to provide methods of use and manufacture of an improved exterior surface covering building material.

It is another object of this invention to provide improved methods of use and manufacture of a building material for covering exterior surfaces of a structure which is resilient and flexible (and thus more easily replaced in case of unit failure), comparatively light weight, less susceptible to burning and attack by organisms, and which exhibits desired water shedding and/or sealing characteristics, while substantially duplicating the appearance of more traditional materials and requiring no retraining of workers to effect its application to a structure.

It is another object of this invention to provide methods of use and manufacture of a building material used as a substitute for traditional building material units made of a different material, the building material including a unit formed of a plastic material and having a size, overall shape, and an exposed surface configuration modeled after a single one of the traditional building material units for which the flexible unit is a substitute.

It is another object of this invention to provide a method for covering a surface with a building material used as a substitute for traditional building material units made of a different material, the method including the steps of forming flexible units made of a flexible plastic material, each one of the flexible units having a size, overall shape, and an exposed surface configuration modeled after a single one of the traditional building material units, and applying the flexible units to the surface utilizing substantially only those techniques utilized to apply the traditional building material units.

It is another object of this invention to provide a method of manufacturing a building material used as a substitute for traditional building units made of a different material, the method including the steps of making a mold having first and second parts, the first part of which is made by taking a metal casting of one of the traditional building units, mounting the parts of the mold in an injection molding machine, loading a plastic material including a blowing agent into the molding machine, the plastic material being characterized after processing by flexibility and a durometer of between about 75 and 100, and injecting the plastic material into the mold so that the unit is formed having a size, overall shape, and exposed surface configuration substantially similar to the traditional building unit.

It is another object of this invention to provide a method for manufacturing a building material used as a substitute for traditional building units made of a different material wherein a mold is made having first and second parts, the second part of the mold configured so that a normally unexposed surface of the building material has a plurality of sunken areas thereat.

It is still another object of this invention to provide a method of manufacturing a roofing unit used in place of a more traditional roofing article made of one of wood and tile material, the method including the steps of formulating a plastic material, heating the plastic material, and forming the roofing unit while the plastic material is still heated so that the unit when formed has a size, overall shape, and first exposed surface configuration substantially similar to the more traditional roofing article.

With these and other objects in view, which will become apparent to one skilled in the art as the description proceeds, this invention resides in the novel formulation, construction, combination, arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of a roof having the surface covering units of this invention with a shake shingle configuration applied thereto;

FIG. 2 is a perspective view of one of the units shown in FIG. 1;

FIG. 3 is a perspective view of the reverse, normally unexposed, surface of the unit of FIG. 2;

FIG. 4 is a sectional view taken through section lines 4—4 of FIG. 3;

FIGS. 5A through 5C illustrate different configurations of the units of this invention;

FIG. 6 is a sectional view taken through section lines 6—6 of FIG. 1; and

FIG. 7 is a block diagram illustrating steps for producing the building material units of this invention.

DESCRIPTION OF THE INVENTION

Building material 15 of this invention is shown applied to surface 17 of roof 19 of structure 21 in FIG. 1. In the case illustrated in FIGS. 1 through 4, the building material has an overall size, shape, and exposed surface configuration modeled after a shake-type shingle (using the method as set forth hereinafter).

Roofing material 15 includes discreet units 23, one of which is illustrated in FIGS. 2 through 4. Normally exposed surface 25 of unit 23 has a wood grain which is a substantial duplicate of a wooden shake shingle after which it is modeled, and includes the overall wedge shape of a natural shake shingle. Normally unexposed surface 27 is formed with a plurality of sunken areas (herein shown as cavities 29) for purposes of both decreasing the weight of the unit and, by providing air pockets between the surface of the roof and the unit, providing improved insulating characteristics. In addition, in combination with the material used to form the unit, this design makes the unit more resilient (as opposed to a solid sheet of material against the surface) thus improving the strength and durability of the unit when subject to impacts, for example in a hail storm or the like.

While unexposed surface 27 of the unit is illustrated with cavities 29, it should be understood that the sunken areas could be formed utilizing a variety of techniques, for example by providing a rib and channel structure at surface 27, or the like.

Units emulating other known, traditional surface covering building materials can be constructed, utilizing the methods as hereinafter set forth, for example those units as illustrated in FIGS. 5A through 5C. FIG. 5A illustrates the units of this invention configured as roofing tiles, such as Spanish tiles, 31. The traditional Spanish tile material and their ilk are made of baked clay, units 31 substantially duplicating their surface characteristics when manufactured in accord with the manufacturing methods hereinafter set forth.

Units 33 in FIG. 5B are modeled after another traditional type of tile unit, typically made of cementitious material, and typically used as roof tiles or patio tiles. Again, the units are made as hereinafter set forth.

A second type of Spanish-style roofing tile unit 35 is illustrated in FIG. 5C modeled after a roofing tile material, again traditionally made of baked clay material or cementitious materials.

Surface covering units 23, 31, 33, and 35 are made of a plastic material (which may be rigid but is preferably flexible), preferably a PVC compound which includes a standard plasticizer and/or rubber, an impact modifier, a blowing agent, a flame retardant, a U.V. inhibitor and a fungicide (or preservative). The PVC material is conventionally formulated (i.e., dry mixed and palletized or granulated) and utilizes known materials, the resulting material having a durometer between 75 and 115 (and preferably a durometer of between 90 and 100) measure on the Shore A scale.

For example, a suitable material may include the following:

| Material | Percent by Weight |
|---|---|
| Vinyl chloride | 45 to 70% |
| Heat stabilizers | 1 to 25% |
| Lubricants | 0.5 to 5% |
| Standard plasticizers, rubber or mixtures thereof | 10 to 50% |
| Impact modifiers | 0 to 10% |
| Inert Fillers | 1 to 35% |
| Pigments | 0 to 4% |
| Blowing agents | 0 to 2% |
| Flame retardants | 0 to 3% |
| Fungicides (or preservatives) | 0 to 4% |
| Processing aids | 0 to 3% |
| Santizers | 0 to 8% |
| U.V. Inhibitors | 0 to 3% |

The heat stabilizers, utilized to hinder and reduce physical (heat and radiation) and chemical (oxygen and ozone) degradation, may include tin stabilizers or various mixed metal stabilizers (for example 2-ethylhexoate).

The lubricants, a processing aid, can include both internal and external lubricants (for example fatty acid amides).

Plasticizers, rubber and/or combinations thereof are provided to preserve flexibility and resiliency of the material. Standard plasticizers which are leach resistant are preferred, for example monomeric di- and tri-esters, such as terephthalates (1,4-benzenetricarboxylates). Pure rubber may be used, with a proper compatible flame retardant, and is desirable for its non-leaching characteristics. Other products, such as DuPont's Alcryn (rubber and PVC), are appropriate.

Impact modifiers, for example acrylic modifiers and/or emulsion produced rubber grafts such as ABS or MBS, are utilized for improving impact strength of the material, among other things.

Pigments, either organic or inorganic, are selected depending on desired colorant family and processing properties (for example iron oxides or disazo to achieve many of the earth tones).

Blowing (or foaming) agents produce the desired lighter weight and resiliency of the material, the preferred agent being azodicarbonamide.

Various processing aids known to those skilled in the art are utilized, for example, to enhance fusion, melt properties, mold release and the like, as are sanitizers for prevention of vinyl degradation during processing. Known U.V. inhibitors may be provided to enhance light stabilization.

It must be realized that some compounds, either alone or in particular combinations, will exhibit one or more of the functional characteristics hereinabove described.

One such PVC compound exhibiting the desired characteristics when processed includes the following materials to produce a cedar shake (reddish brown) colored material having a durometer of between about 90 and 100:

| Material | Chemical or Tradename | Percentage |
|---|---|---|
| Vinyl chloride | — | 68% |
| Heat stabilizers | 2-ethylhexoate | 2% |
| Lubricants | Fatty acid amides | 1% |
| Standard plasticizers, rubber, or mixtures thereof | ACRYN by DuPont | 20% |
| Impact modifiers | — | 0% |
| Fillers | Calcium Carbonate | 2% |
| Pigment | Mixture of TiO2 and Iron Oxides | 1% |
| Blowing agents | Azodicarbonamide | 1% |
| Flame retardants | Chlorinated waxes or Bromo-Chlorinated Strait chain hydrocarbons or molybdenum/ antimony/halogen system | 2% |
| Fungicide | Vinyzene (10,10'-oxyvisphenoxarsine) | 1% |
| Processing aids | Calcium Silicate (anti-blocking agent) | 1% |
| Sanitizers | — | 0% |
| U.V. Inhibitors | MIXXIM 57 by the Fairmount Chemical Co. | 1% |

Processing is conventional, so long as the processing temperatures are sufficient for both processing of the compound and activation of the blowing agents (for example when using the Azodicarbonamide products, in a range of between 300° and 410° F.). The resulting units are light weight, flexible, impact resistant, and exhibit a variety of other desirable characteristics (such as resistance to flame, organic degradation, and light degradation). Use of the pigments can be controlled so that very close color matches are possible, even on short runs, thus allowing units to be easily replaced while closely matching the color of the weathered units in place on the structure.

As illustrated in FIG. 6, the units are applied to the structure utilizing techniques known by workers in the trade and substantially the same as the application techniques utilized for the materials after which the units are modeled. In all cases, the units may be simply nailed to the structure, with the resilience of the material causing a weather tight seal around the nail. Structural integrity may be enhanced, for example at wind sensitive areas of application, by additional nailing and/or gluing at the leading edge of the units, but this is not required.

The roof is first prepared with underlayment 37 (for example "tar" paper, or the like), the weight of the underlayment typically required being less (particularly in the case of the shake-type unit) than is required for underlayment with materials after which the units are modeled. Units 23 are then nailed to the surface, beginning at the bottom course, in the same fashion as utilized with traditional materials (two nails being preferable in each unit). The next course then overlaps the nail line of the previous course, and so on, as is very well known for applying the traditional materials after which the units are modeled by those workers in the field.

FIG. 7 is a diagram illustrating the method for making the units. The units are injection molded in a standard injection molding machine, the hopper of which is loaded with the dry, palletized plastic material as heretofore described. The mold is constructed in two part, the first part being made from a metal casting taken of a single traditional building material unit after which the particular units to be produced are to be modeled. The metal casting (typically done in a foundry) is then utilized to construct the first mold half (by building a pattern having a traditional material unit surface to be modeled adjacent to the appropriately shaped cavity in the pattern, the pattern being packed with sand, and molten metal being poured over the positive impression of the material unit left in the sand). The second mold half (for creating the sunken area features in the unexposed surface of the units) is made utilizing traditional techniques (for exampled being milled from steel stock).

The cast half-mold is preferably made of a mixture of malleable iron and approximately 3% nickel, the exposed surface of the mold being cleaned and chrome plated (to prevent against deterioration caused by the PVC and/or rusting caused by outgassing during the injection molding process). After the mold is installed, the injection molding process is conventional. Upon release from the mold, and removal of the spru, the units are ready for shipment and application.

As may be appreciated from the foregoing, an improved building material for use as a substitute for traditional building material units made of a different material is provided, the building material including a flexible unit formed of a flexible plastic material having a size, overall shape, and an exposed surface configuration modeled after a single one of the traditional building material units, the flexible unit requiring no structure different from the traditional building unit provided for purposes of mounting the flexible unit. The unit is durable, light weight, easy to apply to the surface of a structure and/or replace upon failure of a unit, and is manufactured by a process resulting in a substantial duplicate of the outward, or exposed surface, appearance of the traditional material after which it is modeled.

What is claimed is:

1. A method of manufacturing roof covering units used as substitutes for wooden shingles, said method comprising the steps of;

creating a casting of an exposed surface of a single one of the wooden shingles;

formulating a plastic material;

heating said plastic material to process said plastic material; and utilizing said casting to make a structure and mounting said structure in a machine for receiving said heated plastic material for configuring said roof covering units while said plastic material is still heated so that each individual one of said units has a size, overall shape and first exposed surface configuration substantially similar to said single one of the wooden shingles, said structure including a portion made so that a second substantially planar surface is formed opposite said first surface configuration of each of said units.

2. The method of claim 1 wherein the step of creating a casting comprises taking a metal casting of said single one of the wooden shingles.

3. The method of claim 1 wherein the step of utilizing said casting includes making said structure so that said each individual one of said units has at least one of substantial variations in plastic material thickness between top and bottom surfaces thereof and substantially overall non-planar unit configuration at at least said top and bottom surfaces.

4. The method of claim 1 wherein said structure is a mold.

5. The method of claim 1 wherein said plastic material includes polyvinyl chloride, either one of a leach resistant plasticizer and rubber, and a foaming agent.

6. The method of claim 5 wherein the step of heating said plastic material includes activating said foaming agent.

7. The method of claim 1 wherein said second planar surface has a plurality of sunken areas thereat.

8. A method of manufacturing shingles made of plastic material, each individual one of said plastic material shingles being configured for use to cover a roof surface as a substitute for a more traditional shingle made of a different material, said method comprising the steps of:

providing plastic material having a durometer of between about 90 and 100;

making a mold having first and second sections, said first section of which is made by taking a casting of one of the more traditional shingles made of a different material;

mounting said mold in a molding machine; and injecting said plastic material into said mold so that said each individual one of said plastic material shingles is formed having a size, overall dimensions, and first exposed surface configuration substantially similar to the one of the more traditional shingles utilized to make said first section of said mold, and with a second substantially planar surface opposite said first surface configuration.

9. The method of claim 8 including the step of formulating said plastic material, said plastic material comprising:

between about 45% and 70% vinyl chloride;

between about 1% and 25% of a heat stabilizer;

between about 0.5% and 5% of a lubricant;

between about 10% and 50% of either of a plasticizer and rubber;

between about 0% and 10% of an impact modifier;

between about 0% and 4% pigment;

between about 0% and 3% U.V. inhibitor;

between about 0% and 2% blowing agent;

between about 0% and 3% flame retardant; and between about 0% and 4% fungicide.

10. The method of claim 8 wherein said second section of said mold is configured so that said second surface of said each individual one of said plastic material shingles has a plurality of sunken areas thereat.

11. The method of claim 8 wherein the more traditional shingles made of a different material are one of wooden shingles and roofing tiles, and wherein said first exposed surface configuration is one of a wood grain configuration and a tile texture configuration.

12. A method for providing plastic material shingles for covering a planar surface of a structure to shield the surface from the elements, said method comprising the steps of:

selecting a wooden shingle;

making a metal casting of said wooden shingle;

forming a cavity mold utilizing said casting;

mounting said mold in an injection molding machine;

utilizing said injection molding machine to inject a plastic material into said mold to from a plastic material shingle having a planar mounting surface;

removing said plastic material shingle from said mold; and fastening said plastic material shingle onto the planar surface of the structure with said planar mounting surface abutting the planar surface of the structure.

13. The method of claim 12 wherein the step of fastening the plastic material shingle includes utilizing nails to fasten said plastic material shingle to the surface.

14. The method of claim 12 wherein the step of making a casting of said wooden shingle includes making said casting of a first exposed surface configuration thereof.

15. The method of claim 14 wherein the step of forming a cavity mold includes forming a mold section having a substantially planar surface opposite a mold section formed utilizing said casting of said first exposed surface configuration.

16. The method of claim 15 wherein said mold sections are spaced apart to form a cavity with a substantial spacing difference from one end of said sections to an opposite end of said sections.

* * * * *